(12) United States Patent
Komai et al.

(10) Patent No.: US 8,522,947 B2
(45) Date of Patent: Sep. 3, 2013

(54) ELECTROMAGNETIC CLUTCH AND WATER PUMP

(75) Inventors: Kenichi Komai, Anjo (JP); Atsutoshi Ikegawa, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 219 days.

(21) Appl. No.: 13/048,929

(22) Filed: Mar. 16, 2011

(65) Prior Publication Data

US 2012/0111688 A1     May 10, 2012

(30) Foreign Application Priority Data

Nov. 4, 2010   (JP) ................................. 2010-247630

(51) Int. Cl.
*F16D 27/102*     (2006.01)
*F16D 13/02*     (2006.01)

(52) U.S. Cl.
USPC ............................ 192/90; 192/114 R; 192/75

(58) Field of Classification Search
USPC ............................... 192/84.7, 84.8, 35, 37, 90
See application file for complete search history.

(56) References Cited

U.S. PATENT DOCUMENTS

| | | | | |
|---|---|---|---|---|
| 3,685,622 A | * | 8/1972 | Baer et al. ........................ | 192/35 |
| 3,945,477 A | * | 3/1976 | Maucher et al. ................. | 192/51 |
| 4,069,901 A | | 1/1978 | Sessler | |
| 4,201,281 A | * | 5/1980 | MacDonald ..................... | 192/35 |
| 4,445,606 A | * | 5/1984 | Van Laningham ............. | 192/209 |
| 4,589,536 A | * | 5/1986 | Strikis et al. .................... | 192/35 |
| 5,038,905 A | * | 8/1991 | Nakamura ............... | 192/84.961 |
| 5,967,274 A | | 10/1999 | Leone et al. | |
| 6,343,680 B1 | * | 2/2002 | Hakamada et al. ............. | 192/35 |
| 2010/0126822 A1 | * | 5/2010 | Winkler et al. ................. | 192/90 |
| 2011/0236230 A1 | | 9/2011 | Ikegawa et al. | |
| 2011/0236231 A1 | * | 9/2011 | Ikegawa ........................ | 417/316 |

FOREIGN PATENT DOCUMENTS

| | | |
|---|---|---|
| FR | 2139378 A5 | 1/1973 |
| GB | 1326858 | 8/1973 |
| JP | 57-107440 A | 7/1982 |
| JP | 03-028527 A | 2/1991 |
| JP | 8-002423 Y2 | 1/1996 |
| JP | 11-201191 A | 7/1999 |
| JP | 2001-200860 A | 7/2001 |

OTHER PUBLICATIONS

European Search Report issued by European Patent Office on Jan. 3, 2013 in European Application No. 1158903.2 (4 pages).

* cited by examiner

*Primary Examiner* — Richard M. Lorence
*Assistant Examiner* — Lillian Nguyen
(74) *Attorney, Agent, or Firm* — Buchanan Ingersoll & Rooney PC (57) ABSTRACT

An electromagnetic clutch includes a base portion, a driving member, a driven unit including an output shaft, and an electromagnetic solenoid. The driving member, the driven unit, and the electromagnetic solenoid are assembled on the base portion. The driven unit includes an intermediate member that engages with the output shaft to transmit a torque while being relatively moved towards a rotational axis, the intermediate member being magnetically attracted to the base portion. The driven unit also includes a rotation member that is biased towards the driving member and that is pivotally supported to transmit a rotation of the driving member to the output shaft, a guide mechanism that causes the rotation member to be separated from the driving member while the intermediate member is restrained from moving by being magnetically attracted, and a holding mechanism holding a position of the rotation member that is separated from the driving member.

7 Claims, 7 Drawing Sheets

ELECTROMAGNETIC CLUTCH AND WATER PUMP

CROSS REFERENCE TO RELATED APPLICATIONS

This application is based on and claims priority under 35 U.S.C. §119 to Japanese Patent Application 2010-247630, filed on Nov. 4, 2010, the entire content of which is incorporated herein by reference.

TECHNICAL FIELD

This disclosure relates to an electromagnetic clutch and a water pump.

BACKGROUND DISCUSSION

A known electromagnetic clutch is configured to electrically control a power transmission and interruption relative to a water pump or the like that circulates a cooling water at an engine for a vehicle. Such electromagnetic clutch is disclosed in JPH03-28527A (which will be hereinafter referred to as Reference 1). The electromagnetic clutch disclosed in Reference 1 includes a rotor having a drum shape and being rotatably supported by a compressor housing at which a compressor rotation shaft serving as a rotational shaft of the compressor housing is provided. A frictional surface is integrally formed at the rotor while being positioned perpendicular to a rotational axis of the rotor (the electromagnetic clutch). An exciting coil is arranged at an inner side of the rotor, specifically, at an inner side relative to the frictional surface. In addition, an armature is connected via a plate spring to an inner boss that is connected to the compressor rotation shaft. The armature is arranged to face the frictional surface of the rotor.

According to the electromagnetic clutch disclosed in Reference 1, a power supply to the exciting coil causes the armature to be magnetically attracted in a direction towards the rotor. Then, the plate spring is elastically deformed so that the armature is moved to the rotor to thereby tightly make contact with or be attracted to the frictional surface of the rotor. As a result, the rotor and the armature integrally rotate, thereby transmitting a rotational force of the rotor to the compressor rotation shaft.

JP2001-200860A (which will be hereinafter referred to as Reference 2) discloses an electromagnetic clutch (friction clutch) including a rotor that is rotatable about a rotational axis of the electromagnetic clutch and a driven shaft that is also rotatable about the rotational axis of the electromagnetic clutch. The rotor integrally rotates with a pulley. An intermediate member is supported by a boss of the driven shaft so as to be rotatable about a pin that is positioned in parallel to the rotational axis. The intermediate member rotates about the pin so as to be switchable between a state where the intermediate member is in contact with an outer peripheral surface of the rotor and a state where the intermediate member is away from the outer peripheral surface of the rotor. An electromagnetic coil is provided within the rotor so as to magnetically attract the intermediate member in a direction towards the rotor (i.e., in an inward direction of the electromagnetic clutch). In addition, a spring is provided at the electromagnetic clutch so as to bias the rotor towards an inner peripheral surface of the pulley.

According to the electromagnetic clutch disclosed in Reference 2, an electric power is supplied to the electromagnetic coil to thereby attract the intermediate member towards the rotor against a biasing force of the spring. The intermediate member makes contact with the outer peripheral surface of the rotor accordingly. Then, the intermediate member is further pressed against the outer peripheral surface of the rotor by a torque from the rotor, which leads to a power transmission state in which the rotational force of the rotor is transmitted to the driven shaft. On the other hand, the supply of the electric power to the electromagnetic coil is stopped so that the intermediate member is separated from the outer peripheral surface of the rotor by the biasing force of the spring. As a result, a power interruption state in which the power transmission of the rotational force of the rotor is interrupted is obtained.

The electromagnetic clutch disclosed in Reference 1 includes a configuration in which a driving member makes contact with a driven member by the power supply to the exciting coil to thereby achieve the power transmission. Therefore, in order to maintain the secure power transmission, an increased power supply to the exciting coil may be inevitable.

The electromagnetic clutch disclosed in Reference 2 includes a configuration in which the intermediate member is magnetically attracted to the outer peripheral surface of the rotor by the power supply to the coil. After the intermediate member makes contact with the outer peripheral surface of the rotor, the rotational force of the rotor acts as a force in a direction where the intermediate member makes contact with the outer peripheral surface. As a result, the intermediate member strongly makes contact with the outer peripheral surface of the rotor, thereby achieving the secure power transmission.

However, the electromagnetic clutch is provided not only to achieve the switching between the secure power transmission and the secure power interruption but also to achieve such switching with less power supply. Specifically, in a case where the electromagnetic clutch is provided at a water pump, a radiator fan, or the like for a vehicle engine and therefore the water pump or the radiator fan is brought in a driving state for a longer period of time than in a non-driving state, and a continuous power supply is required in the driving state, an improvement may be necessary in view of energy saving.

A need thus exists for an electromagnetic clutch which is not susceptible to the drawback mentioned above.

SUMMARY

According to an aspect of this disclosure, an electromagnetic clutch includes a base portion, a driving member rotatably driven at a rotational axis by receiving an external driving force, a driven unit including an output shaft that rotates at the rotational axis by receiving a rotation of the driving member, and an electromagnetic solenoid generating a magnetic force while being supplied with an electric power. The driving member, the driven unit, and the electromagnetic solenoid are assembled on the base portion. The driven unit includes an intermediate member that engages with the output shaft in a thrust manner to transmit a torque to the output shaft while being relatively moved towards the rotational axis, the intermediate member being magnetically attracted to the base portion by the magnetic force of the electromagnetic solenoid, the driven unit including a rotation member that is biased towards the driving member to make contact with the driving member and that is pivotally supported to transmit the rotation of the driving member to the output shaft by making contact with the driving member, the driven unit including a guide mechanism that causes the rotation member to be displaced and separated from the driving member while the intermediate member is restrained from moving by being magnetically attracted by the magnetic force of the electromagnetic solenoid, the driven unit including a holding mechanism holding a position of the rotation member that is displaced and separated from the driving member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment will be explained with reference to the attached drawings.

Figure 1:
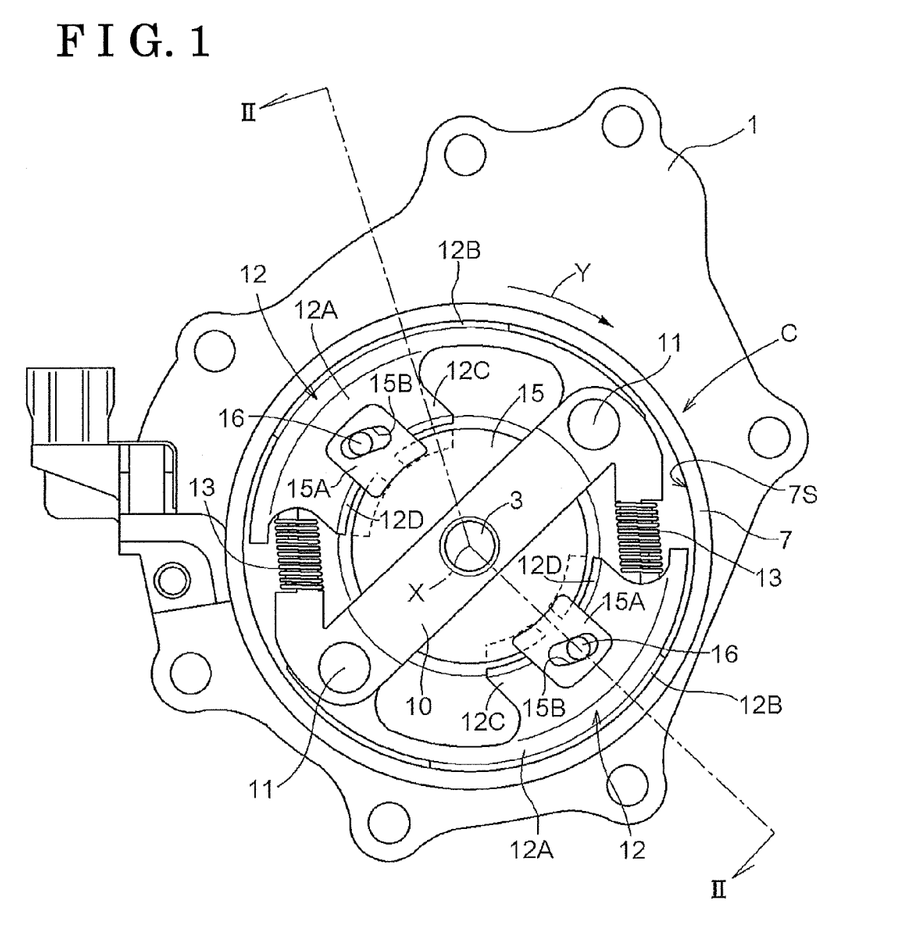
FIG. 1 is a front view illustrating a structure of an electromagnetic clutch according to a first embodiment disclosed here.
Figure 2:
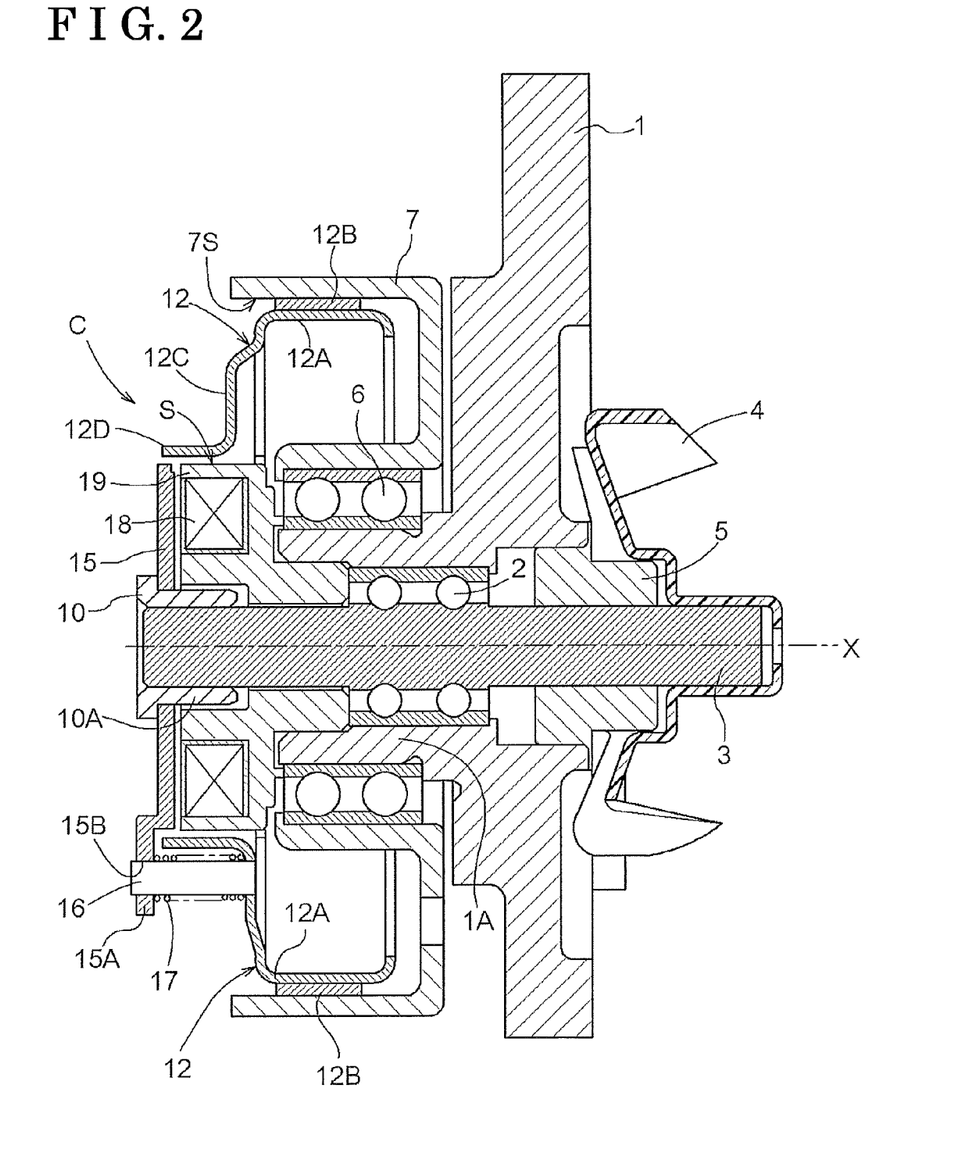
FIG. 2 is a cross-sectional view taken along the line II-II illustrated in FIG. 1.

FIGS. 1 and 2 each illustrate a water pump that is switchable between a power transmission state and a power interruption state by means of an electromagnetic clutch C. The water pump is configured in such a manner that an output shaft 3 is rotatably supported by a pump housing 1 serving as a base portion and a fixed member so that the output shaft 3 is rotatable about a rotational axis X by means of a first bearing 2 having a ball bearing shape. An impeller 4 is provided at an inner end of the output shaft 3 (i.e., a right end of the output shaft 3 in FIG. 2).

The electromagnetic clutch C includes a pulley 7 that is rotatably provided at a boss portion 1A of the pump housing 1 so that the pulley 7 is rotatable about the rotational axis X by means of a second bearing 6 having a ball bearing shape. The pulley 7 is an example of a driving member. The electromagnetic clutch C includes a driven unit transmitting a rotational force of the pulley 7 to the output shaft 3, and an electromagnetic solenoid S supported by the pump housing 1.

The driven unit achieves the power transmission state (i.e., an engagement state) and the power interruption state (i.e., a disengagement state) by controlling an electric power to be supplied and not to be supplied to the electromagnetic solenoid S. That is, the driven unit selects either a state where the power is supplied to the electromagnetic solenoid S or a state where the power is not supplied to the electromagnetic solenoid S.

Figure 3A:
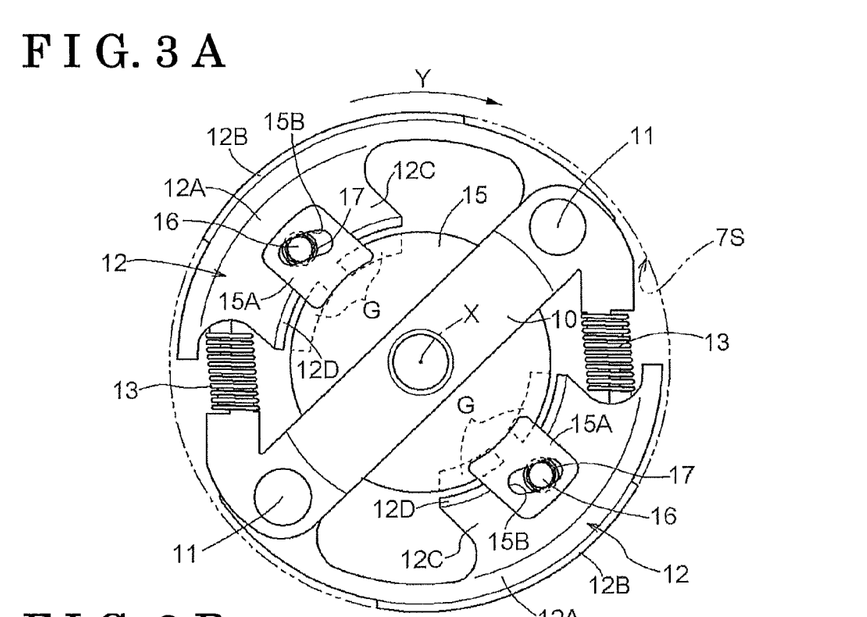
FIG. 3A is a front view of the electromagnetic clutch in a power transmission state according to the first embodiment.
Figure 3B:
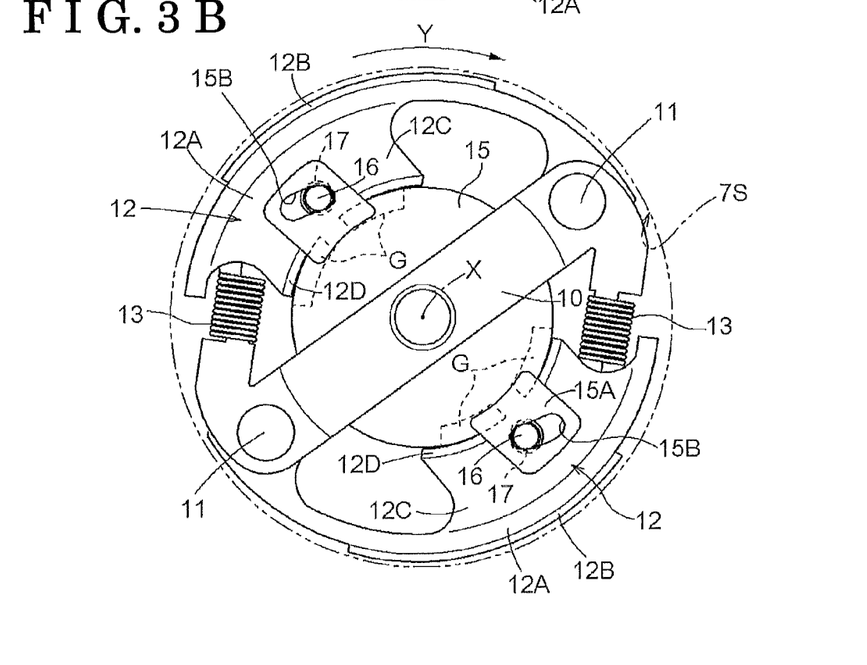
FIG. 3B is a front view of the electromagnetic clutch in a power interruption state according to the first embodiment.

The water pump includes a function to circulate a cooling water of an engine to a radiator. The electromagnetic clutch C is controlled to be in the disengagement state (i.e., the power interruption state) to thereby stop the circulation of the cooling water and enhance a warm-up of the engine in a case where the engine is not sufficiently warmed up, such as immediately after the engine start. A seal 5 is provided at the inner end of the output shaft 3, i.e., in the vicinity of the impeller 4, to seal a clearance relative to the pump housing 1. The pulley 7, serving as an example of the driving member, is formed into a drum shape so as to receive a driving force via an endless belt from an output pulley provided at a crank shaft, or the like that rotates by means of a driving force of the engine. The pulley 7 is specified to constantly rotate in an arrow Y direction (see FIGS. 1 and 3) while the engine is operating.

As mentioned above, the electromagnetic clutch C includes the pulley 7, the output shaft 3, the electromagnetic solenoid S, and the driven unit all of which are assembled on the pump housing 1.

The driven unit includes a frame 10, clutch shoes 12, an operation plate 15, a guide mechanism, and a holding mechanism. The frame 10 is connected to an outer end of the output shaft 3 (i.e., a left end of the output shaft 3 in FIG. 2). The clutch shoes 12, each serving as a rotation member, are pivotally supported by both end portions of the frame 10 via support shafts 11 respectively as illustrated in FIG. 1. The operation plate 15, serving as an intermediate member, engages in a thrust manner with a cylindrical portion 10A that is integrally formed at the frame 10 so that the operation plate 15 is movable relative to the cylindrical portion 10A along the rotational axis X and the operation plate 15 transmits a rotational torque. The guide mechanism guides the clutch shoes 12. The holding mechanism holds the clutch shoes 12 towards the rotational axis X.

The frame 10 is connected to the outer end of the output shaft 3 (i.e., an opposite end of the output shaft 3 from the end where the impeller 4 is provided) so as to extend in a radial direction of the pulley 7, i.e., in a direction perpendicular to the rotational axis X. Then, the clutch shoes 12 are pivotally supported by the both end portions of the frame 10 via the support shafts 11 respectively.

As illustrated in FIG. 1, each of the clutch shoes 12 includes a shoe body 12A formed into an arc shape along an inner peripheral surface 7S of the pulley 7. One end of the shoe body 12A is rotatably supported by the frame 10 via the support shaft 11. A first spring 13 constituted by a compression coil spring is disposed between the other end of the shoe body 12A and the frame 10 so as to bias the shoe body 12A in a direction to make contact with the inner peripheral surface 7S of the pulley 7. A shape, a position, and the like of the first spring 13 may be appropriately changed as long as the first spring 13 biases the shoe body 12A in the direction to make contact with the inner peripheral surface 7S of the pulley 7. A frictional member 12B made of a material having an appropriate friction coefficient and improved abrasion resistance and heat resistance is provided at an outer peripheral surface of the shoe body 12A. A projecting portion 12C is integrally formed at the shoe body 12A at a portion radially opposite from the frictional member 12B in a manner to project towards the rotational axis X.

An attraction piece 12D serving as an example of a magnetic attraction portion is formed at a projecting end of the projecting portion 12C while extending along the rotational axis X and having an arc shape relative to the rotational axis X. The shoe body 12A, the projecting portion 12C, and the attraction piece 12D are integrally formed by a magnetic body having a high permeability such as steel. Alternatively, only the attraction piece 12D may be made of a material attracted by a magnetic force. The attraction pieces 12D of the respective clutch shoes 12 and the electromagnetic solenoid S constitute the holding mechanism.

Extending portions 15A are provided at two portions of an outer periphery of the operation plate 15 so as to face each other in a radial direction thereof. A guide bore 15B having an elongated shape is formed at each of the extending portions 15A. A guide pin 16 formed at each of the projecting portions 12C of the clutch shoe 12 is inserted into the guide bore 15B. In addition, a second spring 17 constituted by a compression coil spring is fitted around the guide pin 16 so as to bias the operation plate 15 towards the outer end of the output shaft 3 along the rotational axis X. At this time, the second spring 17 may be provided radially inwardly relative to a yoke portion 19 (which will be explained later).

The guide bores 15B and the guide pins 16 constitute the guide mechanism. The guide bores 15B are formed in such a manner that the shoe bodies 12A are displaced in a direction towards the rotational axis X by moving along the guide bore 15B when a force is applied from the pulley 7 to the clutch shoes 12 in the arrow Y direction.

Figure 4A:
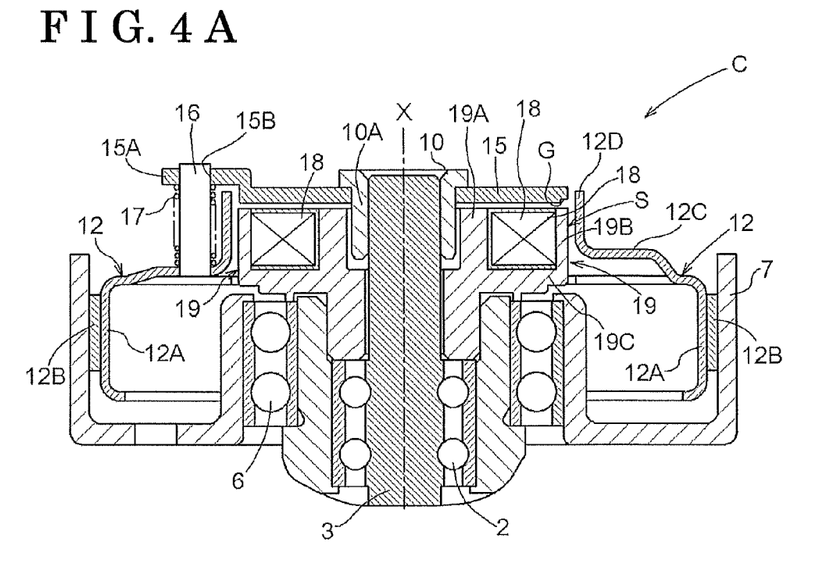
FIG. 4A is a cross-sectional view of the electromagnetic clutch in the power transmission state according to the first embodiment.
Figure 4B:
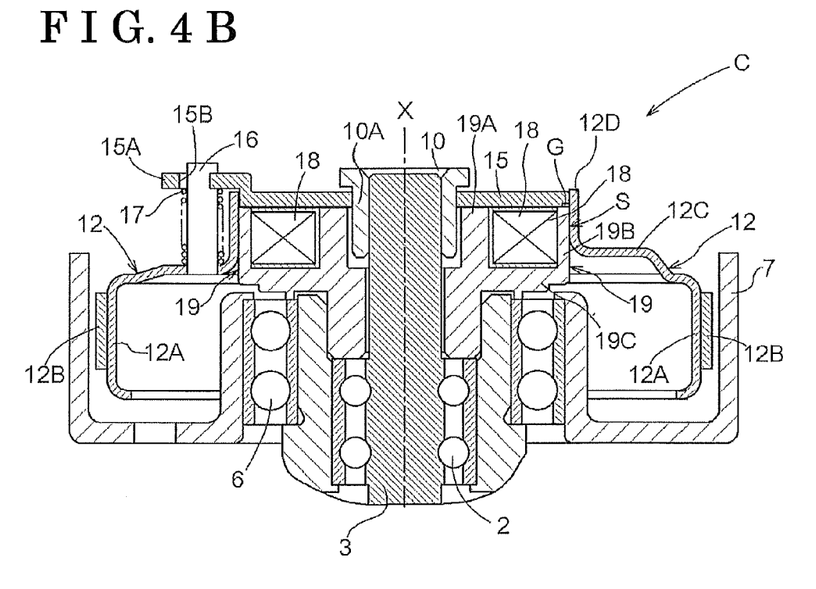
FIG. 4B is a cross-sectional view of the electromagnetic clutch in the power interruption state according to the first embodiment.

The electromagnetic solenoid S supported by the pump housing 1 (an example of the fixed member) is positioned to surround the outer end of the output shaft 3. As illustrated in FIGS. 4A and 4B, the electromagnetic solenoid S includes a coil portion 18 formed into a doughnut shape relative to the rotational axis X and the yoke portion 19 arranged to surround the coil portion 18 and formed by a magnetic body having a high permeability such as steel. The yoke portion 19 includes an inner yoke 19A, an outer yoke 19B, and a connection yoke 19C. The inner yoke 19A is positioned in the vicinity of the rotational axis X relative to the coil portion 18 (i.e., the inner yoke 19A is arranged at a first side of the coil portion 18 facing the rotational axis X). The outer yoke 19B is positioned away from the rotational axis X, i.e., opposite from the inner yoke 19A, relative to the coil portion 18 (i.e., the outer yoke 19B is arranged at a second side of the coil portion 18 being opposite from the first side and being away from the rotational axis X). The connection yoke 19C is connected to the inner yoke 19A and the outer yoke 19B at a side facing the pump housing 1. According to the present embodiment, the operation plate 15 is configured to cover or overlap the inner yoke 19A and the outer yoke 19B when viewed in a direction along the rotational axis X.

A projecting end of the attraction piece 12D (i.e., a left end of the attraction piece 12D in FIG. 2) projects by a thickness of the operation plate 15 relative to an outer end of the outer yoke 19B (i.e., a left end of the outer yoke 19B in FIG. 2) while a diameter of a curved surface of the attraction piece 12D substantially matches a diameter of an outer periphery of the outer yoke 19B. In addition, a diameter of an outer periphery of the operation plate 15 substantially matches the diameter of the outer periphery of the outer yoke 19B. As illustrated in FIGS. 4A and 4B, cut portions G are formed at the outer periphery of the operation plate 15 so as to reduce an area thereof facing the outer yoke 19B. As illustrated in FIGS. 3A and 3B, the cut portions G are formed at only portions of the outer periphery of the operation plate 15 facing the attraction pieces 12D of the clutch shoes 12. In a case where the operation plate 15 is magnetically attracted to the electromagnetic solenoid S, a gap is formed between the operation plate 15 and the outer yoke 19B at each of the cut portions G.

As mentioned above, the electromagnetic clutch C includes the pulley 7, the frame 10 connected to the output shaft 3, two of the clutch shoes 12 supported by the frame 10, the first spring 13 biasing the clutch shoes 12 so as to make contact with the inner peripheral surface 7S of the pulley 7, the operation plate 15 movable along the rotational axis X, the guide mechanism provided between the clutch shoes 12 and the operation plate 15, and the electromagnetic solenoid S applying a magnetic attraction to the operation plate 15.

The electromagnetic solenoid S is controlled so as not to be driven (i.e., an electric power is not supplied to the coil portion 18) in a case where the electromagnetic clutch C is brought to the power transmission state (i.e., the engagement state). In a case where the electromagnetic solenoid S is in a demagnetizing state, as illustrated in FIGS. 3A and 4A, the operation plate 15 is rotatable with the output shaft 3. The two clutch shoes 12 are biased radially outwardly by the first springs 13 respectively. Thus, the frictional members 12B of the clutch shoes 12 make contact with the inner peripheral surface 7S of the pulley 7. The driving force from the pulley 7 is transmitted to the output shaft 3 to thereby drive the impeller 4.

When the electromagnetic clutch C is in the power transmission state, the frictional members 12B of the clutch shoes 12 further make contact in a pressing manner by a centrifugal force with two portions of the inner peripheral surface 7S that are symmetric and facing relative to the rotational axis X. Accordingly, an unbalanced force is restrained to occur between the pulley 7 and the output shaft 3, thereby achieving a well-balanced and secure power transmission.

On the other hand, the electromagnetic solenoid S is controlled so as to be driven (i.e., the electric power is supplied to the coil portion 18) in a case where the electromagnetic clutch C is brought to the power interruption state (i.e., the disengagement state). In a case where the electromagnetic solenoid S is in an exiting state, as illustrated in FIGS. 3B and 4B, the operation plate 15 is magnetically attracted to the electromagnetic solenoid S, thereby stopping the movement of the operation plate 15. Accordingly, because of dynamic inertia of the clutch shoes 12 and the rotational force applied to the clutch shoes 12 from the inner peripheral surface 7S of the pulley 7, the clutch shoes 12 are displaced in the arrow Y direction. Specifically, because the cut portions G are only partially provided at the outer periphery of the operation plate 15, the density of a magnetic flux flowing from the outer yoke 19B to the operation plate 15 increases at regions where the cut portions G are not formed in a case where the operation plate 15 is attracted to the electromagnetic solenoid S, thereby obtaining a strong magnetic attraction.

According to the displacement of the clutch shoes 12, the guide pins 16 are displaced along the respective guide bores 15B formed at the extending portions 15A of the operation plate 15. As a result, the clutch shoes 12 are displaced in a direction approaching the rotational axis X. At a time when the clutch shoes 12 are displaced in the aforementioned manner, the electromagnetic solenoid S is in the exciting state and therefore the attraction pieces 12D of the holding mechanism are magnetically attracted to the electromagnetic solenoid S. Then, the frictional members 12B of the respective clutch shoes 12 are maintained and positioned away from the inner peripheral surface 7S of the pulley 7, thereby bringing the electromagnetic clutch C in the power interruption state.

In the electromagnetic clutch C, in order to bring the attraction pieces 12D of the two clutch shoes 12 to be strongly attracted to a side surface of the electromagnetic solenoid S, the cut portions G are formed so that a magnetic flux flows actively to the attraction pieces 12D from the outer periphery of the operation plate 15.

Figure 5A:
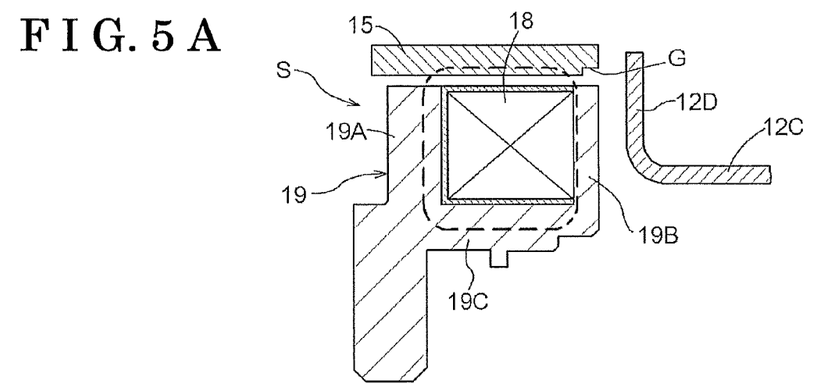
FIGS. 5A, 5B, and 5C are cross-sectional views sequentially illustrating a change in magnetic flux flow in a case where the electromagnetic clutch is switched from the power transmission state to the power interruption state according to the first embodiment.
Figure 5B:
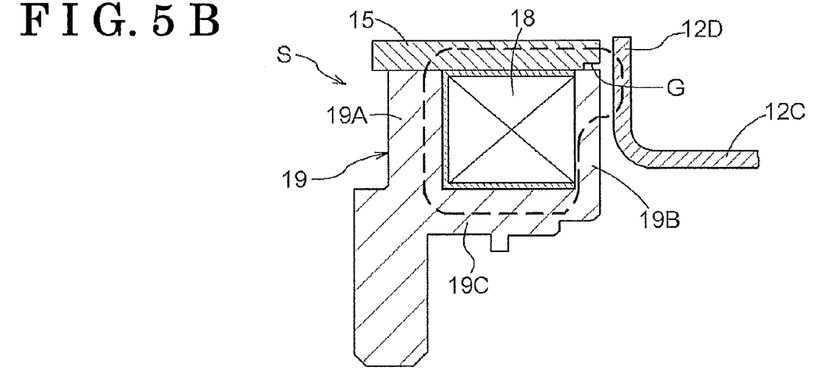

That is, in a case where the power is supplied to the coil portion 18 while the electromagnetic clutch C is in the power transmission state, as illustrated in FIG. 5A, a magnetic flux generated at the coil portion 18 (i.e., a loop indicated by a dashed line in FIG. 5A) flows through the inner yoke 19A, the outer yoke 19B and the connection yoke 19C to the operation plate 15 so that the magnetic flux density thereof increases. Then, as illustrated in FIG. 5B, the operation plate 15 is attracted to the inner yoke 19A and the outer yoke 19B.

Figure 5C:
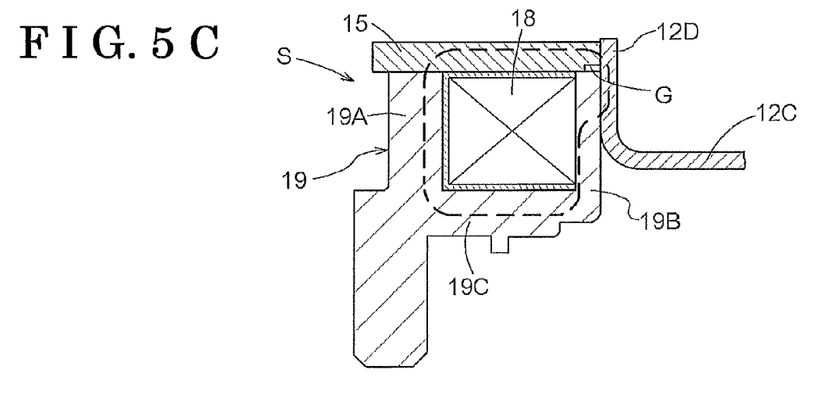

In a state where the operation plate 15 is attracted in the aforementioned manner, each of the cut portions G formed at the outer periphery of the operation plate 15 functions as an air gap. Thus, the magnetic flux leaks to a region from the outer periphery of the operation plate 15 to the outer periphery of the outer yoke 19B at each of the cut portions G and the leaking magnetic flux flows to each of the attraction pieces 12D having the high permeability as illustrated by a dashed line in FIG. 5B. Because the magnetic flux density of each of the attraction pieces 12D increases, the attraction pieces 12D are attracted to the outer peripheral surface of the electromagnetic solenoid S by means of the magnetic attraction as illustrated in FIG. 5C.

In a case where the electromagnetic clutch C is brought to the power transmission state from the power interruption state, the electric current supplied to the coil portion 18 of the electromagnetic solenoid S is interrupted to thereby demagnetize the electromagnetic solenoid S. Accordingly, the operation plate 15 is operated or moved in a direction away from the electromagnetic solenoid S by the biasing force of the second spring 17. In association with such operation of the operation plate 15, the guide mechanism (i.e., the guide bores 15B and the guide pins 16) allows the displacement of the clutch shoes 12 towards the inner peripheral surface 7S of the pulley 7 by the biasing force of the first springs 13. The two clutch shoes 12 are therefore arranged radially outwardly. As a result, the frictional members 12B of the clutch shoes 12 make contact with the inner peripheral surface 7S of the pulley 7, thereby transmitting the driving force from the pulley 7 to the output shaft 3 so as to drive the impeller 4.

A second embodiment will be explained with reference to FIGS. 6 to 8. The second embodiment is different from the first embodiment in the holding mechanism that holds the position of each of the clutch shoes 12 towards the rotational axis X. According to the holding mechanism of the second embodiment, the position of each of the clutch shoes 12 is held by a spring force instead of the electromagnetic force.

Figure 6A:
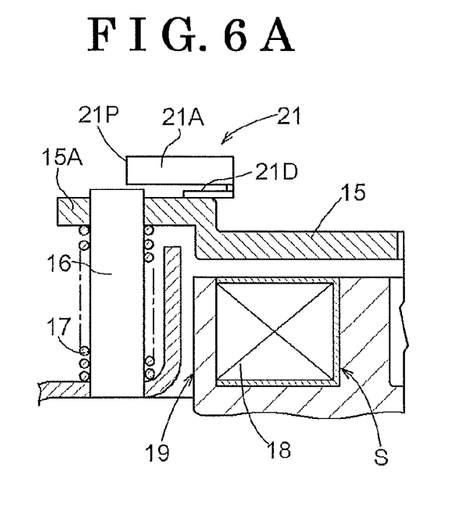
FIG. 6A is a cross-sectional view of the holding mechanism when the electromagnetic clutch is in the power transmission state according to a second embodiment disclosed here.
Figure 6B:
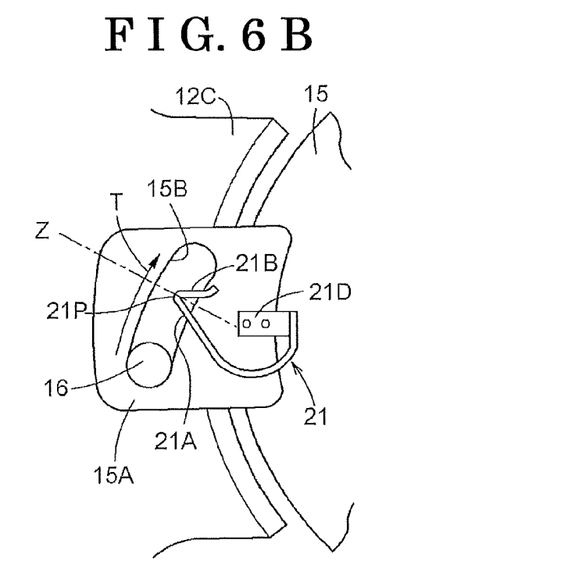
FIG. 6B is a front view of the holding mechanism when the electromagnetic clutch is in the power transmission state according to the second embodiment.
Figure 7A:
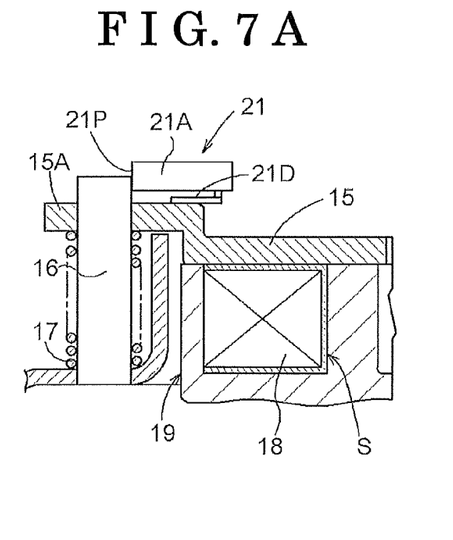
FIG. 7A is a cross-sectional view of the holding mechanism in the early stage when the electromagnetic clutch is brought to the power interruption state according to the second embodiment.
Figure 7B:
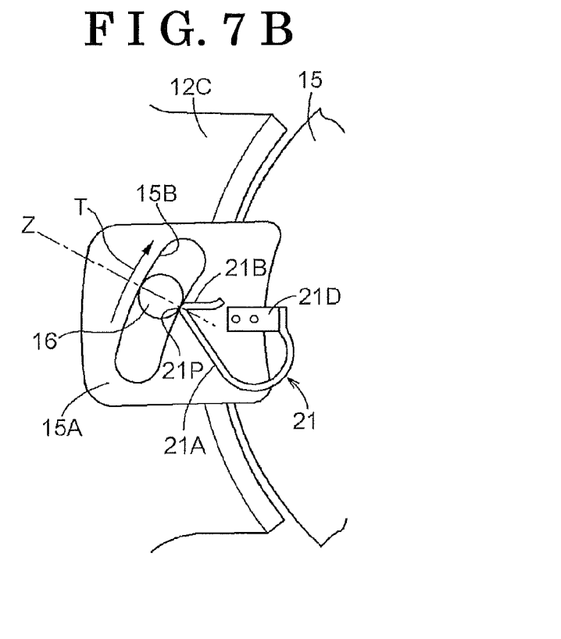
FIG. 7B is a front view of the holding mechanism in the early stage when the electromagnetic clutch is brought to the power interruption state according to the second embodiment.
Figure 8A:
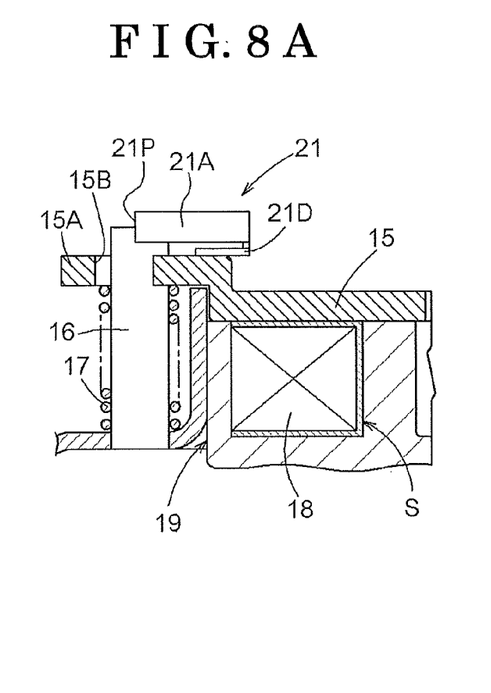
FIG. 8A is a cross-sectional view of the holding mechanism when the electromagnetic clutch reaches the power interruption state according to the second embodiment.
Figure 8B:
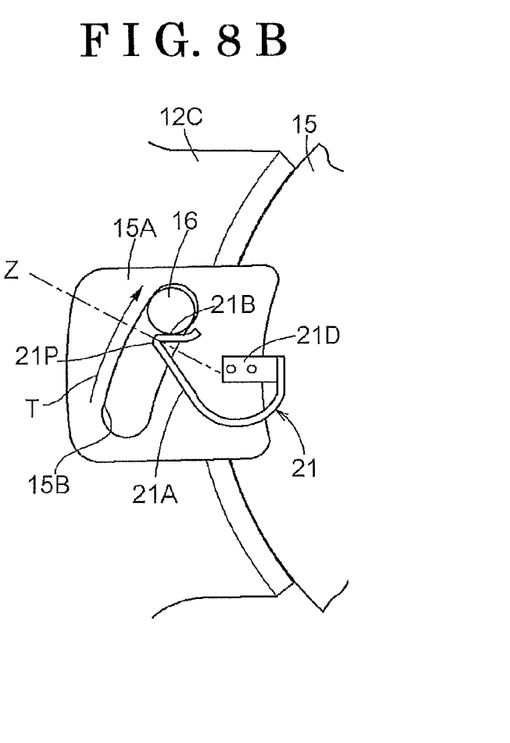
FIG. 8B is a front view of the holding mechanism when the electromagnetic clutch reaches the power interruption state according to the second embodiment.

As illustrated in FIGS. 6 to 8, the holding mechanism of the second embodiment includes the guide pins 16 each serving as a displacement member and integrally displaced with the respective clutch shoes 12, and displacement application members 21. In a case where the operation plate 15 is attracted to the electromagnetic solenoid S because of the magnetic excitation thereof and is restrained from moving, each of the guide pins 16 is displaced in a separation direction T in FIGS. 6B and 7B in association with the displacement of each of the clutch shoes 12, thereby moving the guide pin 16 beyond a holding boundary position Z serving as a predetermined holding boundary position. Then, the displacement application member 21 applies a displacement force to the guide pin 16. As a result, each of the clutch shoes 12 is further separated from the inner peripheral surface 7S of the pulley 7 and is held by the displacement application member 21.

The holding boundary position Z is defined at an upper side of the displacement direction of the clutch shoe 12 (i.e., an upward direction in FIGS. 6B and 7B) relative to a displacement limit for each of the guide pins 16 when the guide pin 16 is displaced by the dynamic inertia of the clutch shoe 12 and the rotational force applied to the clutch shoe 12 from the inner peripheral surface 7S of the pulley 7. Accordingly, in a case where the guide pin 16 is displaced in the separation direction T beyond the holding boundary position Z, the guide pin 16 is held by the displacement application member 21 by the spring force thereof further in the separation direction T beyond the displacement limit.

The displacement application member 21 is made of a plate spring material such as a spring steel that is bent to have a guide surface 21A, a block surface 21B, and a fixing portion 21. The guide surface 21A allows the displacement of the guide pin 16 in a direction where the clutch shoe 12 is separated from the inner peripheral surface 7S of the pulley 7 (i.e., in a holding direction serving as a first direction). The block surface 21B blocks the guide pin 16 that reaches a holding position thereof (see FIG. 8C) to move in a direction where the clutch shoe 12 approaches the inner peripheral surface 7S of the pulley 7 (i.e., in a separation direction serving as a second direction). The guide surface 21A and the block surface 21B are formed while sandwiching or disposing therebetween a tip portion 21P. As illustrated in FIGS. 6A and 6B, the guide surface 21A, the block surface 21B, and the tip portion 21P overlap the guide bore 15B when viewed in a direction along the rotational axis X. In addition, the guide surface 21A, the block surface 21B, and the tip portion 21P are connected and fixed to each of the extending portions 15A of the operation plate 15 via the fixing portion 21D in a state where the tip portion 21P is positioned on the holding boundary position Z.

Each of the guide pins 16 slightly or relatively projects from the operation plate 15 in a state where the operation plate 15 is at a separated position where the operation plate 15 is biased by the second spring 17 in a direction away from the electromagnetic solenoid S and is not attracted by the electromagnetic solenoid S. In addition, the guide pin 16 greatly projects from the operation plate 15 in a state where the operation plate 15 is at an attracted position where the operation plate 15 is attracted to the electromagnetic solenoid S.

According to the aforementioned operation of the operation plate 15, a relative position between the guide pin 16 and the displacement application member 21 is appropriately defined. Specifically, the guide surface 21A and the block surface 21B of the displacement application member 21 make contact with the guide pin 16 in a projecting state where the guide pin 16 greatly projects from the operation plate 15 in the attracted position as illustrated in FIGS. 7A and 7B. On the other hand, the guide surface 21A and the block surface 21B of the displacement application member 21 are restrained from making contact with the guide pin 16 in a retracted state where the guide pin 16 slightly projects from the operation plate 15 in the separated position as illustrated in FIGS. 6A and 6B.

Accordingly, in a case where the operation plate 15 reaches the attracted position by the excitation of the electromagnetic solenoid S, the guide pin 16 greatly projects from the guide bore 15B of the operation plate 15 while being displaced in the separation direction T along the guide bore 15B. In the early stage of such displacement of the guide pin 16, as illustrated in FIGS. 7A and 7B, the guide pin 16 makes contact with the guide surface 21A of the displacement application member 21 and passes through the tip portion 21P (i.e., the holding boundary position Z) while the guide surface 21A is elastically deformed. Then, the guide pin 16 reaches a position where the guide pin 16 makes contact with the block surface 21B.

At a time when the guide pin 16 reaches the position to make contact with the block surface 21B, the tip portion 21P projects towards the guide bore 15B by the biasing force of the plate spring material that constitutes the displacement application member 21, thereby applying the displacement force to the guide pin 16 in the separation direction T. Accordingly, as illustrated in FIGS. 8A and 8B, the clutch shoe 12 is pulled towards the rotational axis X via the guide pin 16 so that the frictional member 12B of each of the clutch shoes 12 is separated from the inner peripheral surface 7S of the pulley 7. Consequently, the electromagnetic clutch C reaches the power interruption state.

Even when a force acting in a direction opposite from the separation direction T is applied to the guide pin 16 in the aforementioned state where the guide pin 16 is in contact with the block surface 21B, the guide pin 16 is restrained from being displaced in the direction opposite from the separation direction T because of the contact with the block surface 21B. The disengagement state (i.e., the power interruption state) of the electromagnetic clutch C is maintained accordingly. Afterwards, in a case where the electromagnetic solenoid S is switched to the demagnetizing state, the operation plate 15 is displaced by the biasing force of the second spring 17 so that the projection of the guide pin 16 relative to the operation plate 15 is reduced. Therefore, the contact between the guide pin 16 and the block surface 21B of the displacement application member 21 is released, thereby allowing the relative movement of the guide pin 16 along the guide bore 15B in the direction opposite from the separation direction T. As a result, the clutch shoe 12 moves in the direction to make contact with the inner peripheral surface 7S of the pulley 7 by the biasing force of the first spring 13, which leads to the power transmission state of the electromagnetic clutch C.

The displacement application member 21 that constitutes the holding member is not limited to be made of the plate spring material. For example, a contact member or the like, at which the guide surface 21A and the block surface 21B are formed while the tip portion 21P is positioned therebetween, may be supported by the operation plate 15 in a state where such contact member is biased to project by a coil spring, and the like. Various structures to apply the displacement force to the guide pin 16 by the contact therewith may be applicable. The holding mechanism may be constituted by the displacement application member 21 in addition to a structure where the attraction piece 12D is attracted to the outer peripheral surface of the electromagnetic solenoid S by the magnetic force.

Further, the displacement member may be provided at the clutch shoe 12. Then, a member that applies the displacement force to the displacement member by making contact therewith may be provided at a member other than the operation plate 15 to thereby constitute the holding mechanism.

The aforementioned electromagnetic clutch C includes a structure where the guide mechanism displaces the clutch shoes 12 from the inner peripheral surface 7S of the pulley 7 by means of a rotational speed difference between the operation plate 15 and the clutch shoes 12 when the operation plate 15 is attracted to the pump housing 1 (fixed member) by the electromagnetic solenoid S. Accordingly, a large capacity of the electromagnetic solenoid S is not necessary by the aforementioned structure as compared with a structure where the clutch shoes 12 are directly operated by the magnetic force of the electromagnetic solenoid S. Further, the electromagnetic clutch C includes the holding mechanism holding each of the clutch shoes 12 at the holding position after bringing the clutch shoes 12 to completely separate from the inner peripheral surface 7S of the pulley 7 in a case where the clutch shoes 12 are displaced in the separation direction. Therefore, a state where each of the clutch shoes 12 partially makes contact with the inner peripheral surface 7S of the pulley 7 is restrained to thereby achieve the complete power interruption state (the disengagement state) of the electromagnetic clutch C.

The electromagnetic clutch C is maintained in the power transmission state when the electromagnetic solenoid S is not powered and is brought to the power interruption state when the electromagnetic solenoid S is powered to excite. Therefore, the usage of the electromagnetic clutch C at a water pump for a vehicle that tends to be used for a longer period of time in the power transmission state than in the power interruption state may achieve a reduction of a power supply time and an energy saving.

Specifically, according to the aforementioned holding mechanism, the magnetic flux flows from the electromagnetic solenoid S to the operation plate 15 and thereafter flows from the cut portions G formed at the operation plate 15 to the attraction pieces 12D of the clutch shoes 12 to thereby increase the magnetic flux density. Therefore, the structure where the electromagnetic solenoid S attracts the operation plate 15 is not necessarily greatly modified or changed for the application of the strong attraction force to the attraction pieces 12D. The complete power interruption state of the electromagnetic clutch C is obtained accordingly.

Further, in a case where the holding mechanism includes the displacement application member 21 made of the plate spring material so as to make contact with the guide pin 16, the spring force is directly applied to the guide pin 16 in the power interruption state of the electromagnetic clutch C. Each of the clutch shoes 12 is brought to the holding position accordingly, thereby obtaining the complete power interruption state of the electromagnetic clutch C by a relatively simple structure.

The electromagnetic clutch C of the present embodiments may be applicable to a power transmission system such as a radiator fan and a supercharger besides a water pump.

According to the aforementioned embodiments, in a case where the electromagnetic solenoid S is not powered, the operation plate 15 is not magnetically attracted to the pump housing 1. Therefore, the clutch shoes 12 pivotally supported by the frame 10 make contact with the pulley 7 by the biasing force. The rotation of the pulley 7 is transmitted to the output shaft 3 via the clutch shoes 12 and the driven unit. In addition, in a case where the electromagnetic solenoid S is powered, the operation plate 15 is magnetically attracted to the pump housing 1 so that the movement of the operation plate 15 is stopped. Therefore, a rotational speed of each of the clutch shoes 12 becomes greater than a rotational speed of the operation plate 15. Because of the rotation of each of the clutch shoes 12, the clutch shoes 12 are displaced so as to be away from the pulley 7 by means of the guide bores 15B and the guide pins 16. Then, the attraction pieces 12D of the clutch shoes 12 and the electromagnetic solenoid S maintain and retain positions of the clutch shoes 12 that are displaced. Further, in order to achieve the power interruption state of the electromagnetic clutch C, the clutch shoes 12 are displaced by the rotational force of the pulley 7. Thus, according to the present embodiments, the size of the magnetic solenoid S may be smaller as compared to a case where the clutch shoes 12 are directly operated by the magnetic attraction of the electromagnetic solenoid S. As a result, the electromagnetic clutch C that securely performs the switching operation by less electric power may be obtained.

According to the aforementioned embodiments, the operation plate 15 and the attraction piece 12D formed at the clutch shoe 12 are each formed by a magnetic body, and the holding mechanism is configured to increase the density of the magnetic flux flowing from the operation plate 15 to the attraction piece 12D by an approach of the attraction piece 12D to the operation plate 15 and to hold a position of the attraction piece 12D by the magnetic attraction caused by the magnetic force in a case where the operation plate 15 moves from the separated position where the operation plate 15 is away from the pump housing 1 to the attracted position where the operation plate 15 is attracted to the pump housing 1.

Accordingly, in a case where the electric power is supplied to the electromagnetic solenoid S so as to interrupt the power transmission and thus the operation plate 15 is attracted to the electromagnetic solenoid S, the operation plate 15 approaches the attraction pieces 12D of the clutch shoes 12. Thus, the density of the magnetic flux flowing from the operation plate 15 to the attraction pieces 12D increases. The attraction pieces 12D are attracted to the electromagnetic solenoid S so that the position of each of the clutch shoes 12 is held and maintained. That is, a selection of materials of the operation plate 15 and the attraction pieces 12D and a positional relationship therebetween also achieve a holding of each of the clutch shoes 12 by the electromagnetic solenoid S that magnetically attracts the operation plate 15.

In addition, according to the aforementioned embodiments, the operation plate 15 and the attraction piece 12D formed at the clutch shoe 12 are each formed by a magnetic body, and the cut portion G is formed at a portion of the operation plate 15 so as to face the attraction piece 12D of the clutch shoe 12.

Because the cut portions G are formed at the operation plate 15, the density of the magnetic flux flowing between the operation plate 15 and the attraction pieces 12D increases when the operation plate 15 is attracted to the electromagnetic solenoid S. Accordingly, the clutch shoes 12 are attracted to the electromagnetic solenoid S by the strong magnetic attraction.

Further, according to the aforementioned embodiments, the operation plate 15 and the attraction portion 12D formed at the clutch shoe 12 are each formed by a magnetic body, and the cut portion G is formed at a portion of the operation plate 15 so as to face the attraction portion 12D of the clutch shoe 12 and the electromagnetic solenoid S.

Because the cut portions G are formed at the operation plate 15, the density of the magnetic flux flowing between the operation plate 15 and the attraction pieces 12D increases when the operation plate 15 is attracted to the electromagnetic solenoid S. Accordingly, the clutch shoes 12 are attracted to the electromagnetic solenoid S by the strong magnetic attraction.

Furthermore, according to the aforementioned embodiments, the electromagnetic solenoid S includes the coil portion 18 arranged to form a doughnut shape relative to the rotational axis X, the inner yoke 19A arranged at the first side of the coil portion 18 facing the rotational axis X, and the outer yoke 19B arranged at the second side of the coil portion 18 being opposite from the first side and being away from the rotational axis X. The operation plate 15 is configured to cover the inner yoke 19A and the outer yoke 19B when viewed in a direction along the rotational axis X and to include the cut portion G at the outer peripheral surface of the operation plate 15 so as to reduce an area facing the outer yoke 19B so that the magnetic flux flows to the attraction piece 12D from an outer periphery of the operation plate 15.

Accordingly, in a case where the operation plate 15 is attracted to the electromagnetic solenoid S, the density of the magnetic flux flowing between the outer peripheral surface of the operation plate 15 and the attraction pieces 12D increases to thereby attract the clutch shoes 12 to a side surface of the electromagnetic solenoid S by the strong magnetic attraction.

Furthermore, according to the aforementioned second embodiment, the holding mechanism includes the guide pin 16 that is integrally displaced with the clutch shoe 12, and the displacement application member 21 applying a displacement force to the guide pin 16 so that the clutch shoe 12 is further moved to be away from the pulley 7 and holding a position of the clutch shoe 12 in a case where the clutch shoe 12 is displaced and separated from the pulley 7 towards the rotational axis X by the guide mechanism and the guide pin 16 is moved beyond the holding boundary position Z in association with the displacement and separation of the clutch shoe 12.

Accordingly, in a case where the clutch shoes 12 are displaced and separated from the pulley 7, the guide pins 16 are also displaced. Then, when each of the guide pins 16 moves beyond the holding boundary position Z, the displacement application member 21 applies the displacement force to each of the guide pins 16 so as to bring the guide pins 16 to be further displaced in the separation direction and held. That is, when the clutch shoes 12 are displaced and separated from the pulley 7, such displacement and separation are assisted by the displacement application member 21.

Furthermore, according to the aforementioned second embodiment, the guide mechanism includes the guide bore 15B formed at the operation plate 15 and the guide pin 16 formed at the clutch shoe 12 and inserted to the guide bore 15B. The displacement application member 21 is supported by the operation plate 15 while being made of a plate spring material and including the guide surface 21A allowing the movement of the guide pin 16 in the first direction in a case where the clutch shoe 12 is displaced and separated from the pulley 7 and the block surface 21B blocking the movement of the guide pin 16 that passes through the guide surface 21A in the second direction opposite from the first direction. The displacement application member 21 is arranged to achieve a positional relationship in which the displacement application member 21 makes contact with the guide pin 16 projecting from the operation plate 15 that is arranged at the attracted position where the operation plate 15 is attracted to the pump housing 1 and in which the displacement application member 21 is restrained from making contact with the guide pin 16 when the operation plate 15 is arranged at the separated position where the operation plate 15 is away from the pump housing 1.

Accordingly, in a case where the operation plate 15 reaches the attracted position where the operation plate 15 is attracted to the electromagnetic solenoid S by the power supply thereto, each of the guide pins 16, inserted into each of the guide bores 15B that are formed at the operation plate 15, projects from the operation plate 15. As a result, the guide surface 21A and the block surface 21B of the displacement application member 21 that is supported by the operation plate 15 are contactable with the guide pin 16. In such state, when the guide pin 16 is displaced to a position beyond the holding boundary position Z, the spring force is applied to the guide pin 16 from the displacement application member 21. The spring force causes each of the clutch shoes 12 to be further displaced in the separation direction via the guide pin 16. Then, when the guide pin 16 reaches the block surface 21B, the guide pin 16 is restrained from moving in an opposite direction from the separation direction. In addition, when the supply of the electric power is stopped to the electromagnetic solenoid S, the operation plate 15 is brought to the separation position. Then, the block surface 21B of the displacement application member 21 supported by the operation plate 15 is separated from the guide pin 16. As a result, the clutch shoes 12 make contact with the pulley 7 by the biasing force to thereby transmit the rotational force of the pulley 7 to the output shaft 3.

Furthermore, according to the aforementioned embodiments, a water pump includes the electromagnetic clutch C that includes the pump hosing 1, the pulley 7 rotatably driven at the rotational axis X by receiving an external driving force, the driven unit including the output shaft 3 that rotates at the rotational axis X by receiving a rotation of the pulley 7, and the electromagnetic solenoid S generating a magnetic force while being supplied with an electric power. The pulley 7, the driven unit, and the electromagnetic solenoid S are assembled on the pump housing 1. The driven unit includes the operation plate 15 that engages with the output shaft 3 in a thrust manner to transmit a torque to the output shaft 3 while being relatively moved towards the rotational axis X, the operation plate 15 being magnetically attracted to the pump housing 1 by the magnetic force of the electromagnetic solenoid S, the driven unit including the clutch shoe 12 that is biased towards the pulley 7 to make contact with the pulley 7 and that is pivotally supported to transmit the rotation of the pulley 7 to the output shaft 3 by making contact with the pulley 7, the driven unit including the guide mechanism that causes the clutch shoe 12 to be displaced and separated from the pulley 7 while the operation plate 15 is restrained from moving by being magnetically attracted by the magnetic force of the electromagnetic solenoid S, the driven unit including the holding mechanism holding a position of the clutch shoe 12 that is displaced and separated from the pulley 7.

Accordingly, in a case where the electromagnetic solenoid S is not powered, the operation plate 15 is not magnetically attracted to the pump housing 1. Therefore, the clutch shoes 12 pivotally supported by the frame 10 make contact with the pulley 7 by the biasing force. The rotation of the pulley 7 is transmitted to the output shaft 3 via the clutch shoes 12 and the driven unit. In addition, in a case where the electromagnetic solenoid S is powered, the operation plate 15 is magnetically attracted to the pump housing 1 so that the movement of the operation plate 15 is stopped. Therefore, a rotational speed of each of the clutch shoes 12 becomes greater than a rotational speed of the operation plate 15. Because of the rotation of each of the clutch shoes 12, the clutch shoes 12 are displaced so as to be away from the pulley 7 by means of the guide bores 15B and the guide pins 16. Then, the attraction pieces 12D of the clutch shoes 12 and the electromagnetic solenoid S maintain and retain positions of the clutch shoes 12 that are displaced. Further, in order to achieve the power interruption state of the electromagnetic clutch C, the clutch shoes 12 are displaced by the rotational force of the pulley 7. Thus, according to the present embodiments, the size of the magnetic solenoid S may be smaller as compared to a case where the clutch shoes 12 are directly operated by the magnetic attraction of the electromagnetic solenoid S. As a result, the electromagnetic clutch C that securely performs the switching operation by less electric power may be obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An electromagnetic clutch for a water pump of a vehicle engine comprising:
   a base portion;
   a driving member rotatably driven at a rotational axis by receiving an external driving force;
   a driven unit including an output shaft that rotates at the rotational axis by receiving a rotation of the driving member; and
   an electromagnetic solenoid generating a magnetic force while being supplied with electric power,
   the driving member, the driven unit, and the electromagnetic solenoid being assembled on the base portion,
   the driven unit including an intermediate member that engages with the output shaft in a thrust manner to transmit a torque to the output shaft while being relatively moved along the rotational axis, the intermediate member being magnetically attracted to the base portion by the magnetic force of the electromagnetic solenoid, the driven unit including a rotation member that is biased towards the driving member to make contact with the driving member when electric power is not supplied to the electromagnetic solenoid and that is pivotally supported to transmit the rotation of the driving member to the output shaft by making contact with the driving member, the driven unit including a guide mechanism that causes the rotation member to be displaced and separated from the driving member when electric power is supplied to the electromagnetic solenoid while the intermediate member is restrained from moving by being magnetically attracted by the magnetic force of the electromagnetic solenoid, the driven unit including a holding mechanism holding a position of the rotation member that is displaced and separated from the driving member.

2. The electromagnetic clutch according to claim 1, wherein the intermediate member and a magnetic attraction portion formed at the rotation member are each formed by a magnetic body, and the holding mechanism is configured to increase a density of a magnetic flux flowing from the intermediate member to the magnetic attraction portion by an approach of the magnetic attraction portion to the intermediate member and to hold a position of the magnetic attraction portion by a magnetic attraction caused by the magnetic force in a case where the intermediate member moves from a separated position where the intermediate member is away from the base portion to an attracted position where the intermediate member is attracted to the base portion.

3. The electromagnetic clutch according to claim 2, wherein the electromagnetic solenoid includes a coil portion arranged to form a doughnut shape relative to the rotational axis, an inner yoke arranged at a first side of the coil portion facing the rotational axis, and an outer yoke arranged at a second side of the coil portion being opposite from the first side and being away from the rotational axis, and wherein the intermediate member is configured to cover the inner yoke and the outer yoke when viewed in a direction along the rotational axis and to include a cut portion at an outer peripheral surface of the intermediate member so as to reduce an area facing the outer yoke so that a magnetic flux flows to the magnetic attraction portion from an outer periphery of the intermediate member.

4. The electromagnetic clutch according to claim 1, wherein the intermediate member and a magnetic attraction portion formed at the rotation member are each formed by a magnetic body, and a cut portion is formed at a portion of the intermediate member so as to face the magnetic attraction portion of the rotation member.

5. The electromagnetic clutch according to claim 1, wherein the intermediate member and a magnetic attraction portion formed at the rotation member are each formed by a magnetic body, and a cut portion is formed at a portion of the intermediate member so as to face the magnetic attraction portion of the rotation member and the electromagnetic solenoid.

6. The electromagnetic clutch according to claim 1, wherein the holding mechanism includes a displacement member that is integrally displaced with the rotation member, and a displacement application member applying a displacement force to the displacement member so that the rotation member is further moved to be away from the driving member and holding a position of the rotation member in a case where the rotation member is displaced and separated from the driving member towards the rotational axis by the guide mechanism and the displacement member is moved beyond a predetermined holding boundary position in association with the displacement and separation of the rotation member.

7. The electromagnetic clutch according to claim 6, wherein the guide mechanism includes a guide bore formed at the intermediate member and a guide pin formed at the rotation member and inserted to the guide bore, wherein the displacement application member is supported by the intermediate member while being made of a plate spring material and including a guide surface allowing a movement of the guide pin in a first direction in a case where the rotation member is displaced and separated from the driving member and a block surface blocking the movement of the guide pin that passes through the guide surface in a second direction opposite from the first direction, and wherein the displacement application member is arranged to achieve a positional relationship in which the displacement application member makes contact with the guide pin projecting from the intermediate member that is arranged at an attracted position where the intermediate member is attracted to the base portion and in which the displacement application member is restrained from making contact with the guide pin when the intermediate member is arranged at a separated position where the intermediate member is away from the base portion.

* * * * *